United States Patent [19]

Takiguchi et al.

[11] Patent Number: 4,984,873
[45] Date of Patent: Jan. 15, 1991

[54] LIQUID CRYSTAL DISPLAY DEVICE

[75] Inventors: Yasuyuki Takiguchi, Kawasaki; Akihiko Kanemoto, Yokohama; Kenya Yokoi, Yokohama; Haruo Iimura, Yokohama; Takamichi Enomoto, Shiroyama; Sumio Kamoi, Kawasaki, all of Japan

[73] Assignee: Ricoh Company, Ltd., Tokyo, Japan

[21] Appl. No.: 238,510

[22] Filed: Aug. 31, 1988

[30] Foreign Application Priority Data

| | | | |
|---|---|---|---|
| Aug. 31, 1987 | [JP] | Japan | 62-217042 |
| Nov. 10, 1987 | [JP] | Japan | 62-282078 |
| Dec. 3, 1987 | [JP] | Japan | 62-307111 |
| Apr. 27, 1988 | [JP] | Japan | 63-106039 |
| Jun. 20, 1988 | [JP] | Japan | 63-151963 |

[51] Int. Cl.$^5$ .............................................. G02F 1/13
[52] U.S. Cl. .................................. 350/337; 350/347 E; 350/347 R
[58] Field of Search ............... 350/339 R, 346, 347 R, 350/337, 347 E

[56] References Cited

U.S. PATENT DOCUMENTS

| | | | |
|---|---|---|---|
| 4,533,214 | 8/1985 | Penz et al. | 350/339 R |
| 4,844,569 | 7/1989 | Wada et al. | 350/347 R |
| 4,852,976 | 8/1989 | Suzuki | 350/347 R |

FOREIGN PATENT DOCUMENTS

| | | |
|---|---|---|
| 69186 | 5/1980 | Japan . |
| 0146224 | 8/1985 | Japan . |
| 0175030 | 9/1985 | Japan . |
| 46928 | 7/1986 | Japan . |

Primary Examiner—Stanley D. Miller
Assistant Examiner—Anita Pellman Gross
Attorney, Agent, or Firm—Oblon, Spivak, McClelland, Maier & Neustadt

[57] ABSTRACT

A liquid crystal display device, comprising:

(a) a liquid crystal layer disposed between a pair of light permeable substrates, an alignment of a liquid crystal of said liquid crystal layer being substantially horizontal relative to said substrates in the absence of applied voltage, said liquid crystal layer having a twisted structure with a twist angle along a direction of a thickness thereof such that an adequate display is provided without substantially reducing the time dimensional driving;

(b) a pair of polarization means disposed on both outsides of said liquid crystal layer; and (c) at least one birefringent medium layer disposed between one side of said liquid crystal layer and the polarization means on said one side of said liquid crystal layer; an optical axis of said birefringent medium layer being inclined toward a polarization axis of the adjacent polarization means, the alignment direction of said liquid crystal on a surface of another side of said liquid crystal layer making an angle from 0° to 25° relative to the polarization transmission axis or an absorption axis of the polarization means, the direction of a maximum refractive index of said birefringent medium layer and the alignment direction of said liquid crystal on a surface of said one side of said liquid crystal layer on a surface of said one side of said liquid crystal layer making an angle from 20° to 130° while a retardation of said birefringent medium layer is in a range of 0.125 $\pi$rad to 1 $\pi$rad and a retardation of said liquid crystal layer is about 3/2 $\pi$rad or about 2 $\pi$rad.

1 Claim, 2 Drawing Sheets

LIQUID CRYSTAL DISPLAY DEVICE

BACKGROUND OF THE INVENTION

1. Field of the Invention

The present invention relates to a liquid crystal display device having a liquid crystal layer placed between substrates, wherein the liquid crystal alignment is substantially horizontal to the substrates when voltage is not applied, and having a twisted structure with a twist angle between 120° and 360° along the direction of the thickness of the liquid crystal layer; and a pair of polarization means disposed to both outsides of the liquid crystal layer.

2. Description of the Background

The liquid crystal display mode predominantly used at present is referred to as the twisted nematic (TN) type in which liquid crystal molecules have a structure twisted by an angle about 90° between a pair of upper and lower substrates, which utilizes the rotation of the plane of polarization due to the liquid crystal and the elimination of such an effect by the application of voltage. This display mode is sufficiently effective for time divisional drive at low rate such as for clocks or pocket electronic calculators but, if it is driven under high time divisional rate for increasing the display capacity, it results in drawbacks such as reduction in the contrast or narrowing in the view angle. This is caused under the time divisional driving at high rate since the ratio of voltage applied to a selection point and a not-selection point approaches 1 and, in order to obtain a high contrast and wide view angle for the display device, it is necessary to reduce the abruptness $\gamma$ represented by the ratio ($V_{50}/V_{10}$), which is the ratio of the voltage $V_{50}$ where the relative transmittance of the device changes by 50% to $V_{10}$ where it changes by 10%, as small as possible.

In the case of the twisted nematic type, the $\gamma$ value is about 1.13. For reducing the $\gamma$ value, a method of increasing the twist angle of liquid crystal molecules and deviating the polarization axis from the alignment direction of the liquid crystal has been proposed, which is referred to as SBE (Super Birefringence Effect) mode or STN (Super Twisted Nematic) mode. According to such a method, the $\gamma$ value can be reduced to less than 1.1 and time divisional driving at high rate of about 1/400 duty ratio is possible.

However, since the coloration due to the birefringence and the change thereof due to the voltage are utilized in such a system, it is theoretically difficult to conduct a black and white display, and the transmission light or reflection light of the liquid crystal cell is colored to cause display on a colored background. In order to eliminate such coloration, it has also been known to superimpose another color-offsetting liquid crystal cell with the opposite twisting direction of the liquid crystal molecules in the STN type liquid crystal cell. However, since two liquid crystal cells are overlaid in this case, it increases the cost. Additionally, the entire thickness and weight are increased and, there is also the drawback that display characters appear to float because of the increase in the distance between the polarization plate and the display liquid crystal layer.

Thus, a need continues to exist for a liquid crystal display device having a reduced thickness and weight as well as having excellent display characteristics.

SUMMARY OF THE INVENTION

Accordingly, it is an object of the present invention to provide a liquid crystal display device having a reduced thickness and weight, and having excellent display characteristics.

In particular, the above and other objects are provided, in part, by a liquid crystal display device, containing:

(a) a liquid crystal layer disposed between a pair of light permeable substrates, the alignment of the liquid crystal of said crystal layer being substantially horizontal relative to said substrates in the absence of applied voltage, said crystal layer having a twisted structure with a twist angle along the direction of the thickness thereof such that an adequate display is provided without substantially reducing the time divisional driving, (b) a pair of polarization means disposed on both outsides of said crystal layer, and (c) at least one birefringent medium layer disposed between said crystal layer and said polarization means, wherein the optical axis of said birefringent medium is inclined toward the polarization axis of the adjacent polarization means.

The present invention also provides, in part:

a liquid crystal display device containing:

(a) a liquid crystal layer disposed between a pair of light permeable substrates, the alignment of the liquid crystal of said crystal layer being substantially horizontal relative to said substrates in the absence of applied voltage, said crystal layer having a twisted structure with a twist angle along the direction of the thickness thereof such that an adequate display is provided without substantially reducing the time divisional driving, and (b) a pair of polarization means disposed on both outsides of said crystal layer, at least one of said polarization means being made of birefringent medium, wherein the optical axis of said birefringent medium is inclined toward the polarization axis of the adjacent polarization means.

DETAILED DESCRIPTION OF THE PREFERRED EMBODIMENT

Figure 1:
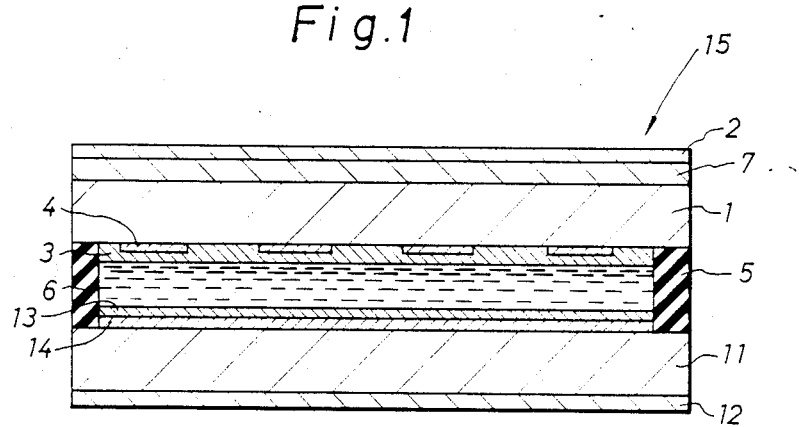
FIG. 1 is a cross sectional view of a preferred embodiment of the liquid crystal display device according to the present invention.

This invention is to be described specifically while referring to the drawings.

Figure 2:
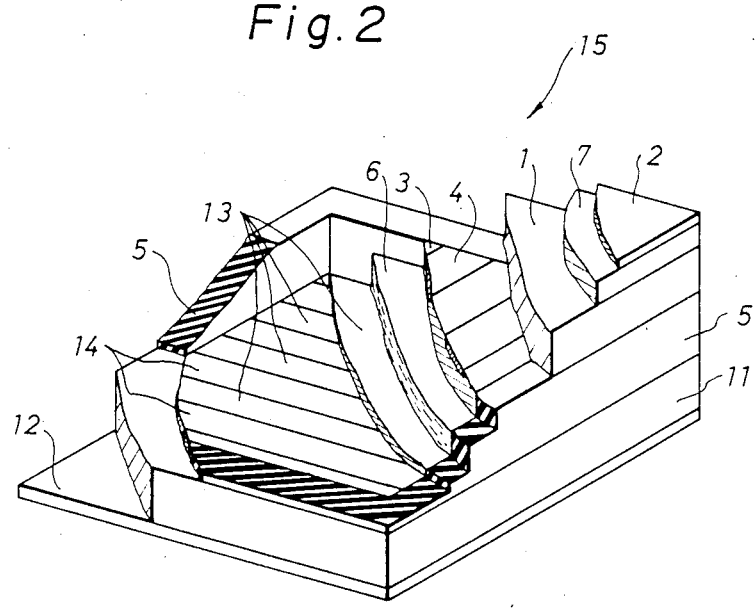
FIG. 2 is a partially broken away perspective side view of a preferred embodiment of the liquid crystal device according to the present invention.

FIG. 1 and FIG. 2 are cross sectional view and partially broken away perspective side view, respectively, illustrating a preferred embodiment of the liquid crystal display device according to the present invention. In these figures, a first substrate 1 and a second substrate 11 are arranged apart from and opposed to each other and alignment films 3, 13 applied with alignment treatment and transparent electrodes 4, 14 are disposed in a crosswise manner to the respective substrates 1 and 11. Liquid crystal 6 is sealed between the films 3 and 13 to constitute a cell of the liquid crystal 6 seal portions 5 are disposed for sealing the liquid crystal 6 between the substrate 1 and 11. The cell of the liquid crystal 6 and the substrates 1 and 11 are put between the first polarization means 2 and the second polarization means 12 to constitute a liquid crystal display device 15.

Birefringent medium 7 is disposed between the substrate 1 and the polarization means 2. The liquid crystal display device 15 may be made as a reflection type by disposing a reflection plate to the outside for one of the polarization means 2 and 12.

The alignment treatment of the display device 15 on the substrates 1 and 11 are applied such that the molecules of the liquid crystal 6 are aligned substantially horizontal while the voltage is not applied and the liquid crystal 6 is aligned along with the direction of the alignment treatment. In this case, "substantially horizontal" referred to for the alignment of the molecules of the liquid crystal 6 means that the angle of inclination of the molecules of the liquid crystal 6 relative to the substrate 1 and 11 is within a range about from 0° to 30°.

Figure 3:
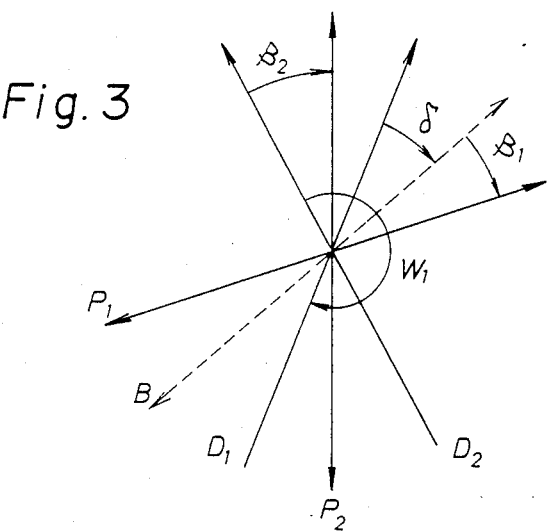
FIG. 3 is an explanatory view illustrating angular relationships for the direction of polarization axis in the liquid crystal display device according to the present invention.

FIG. 3 shows the definition for angles regarding the preferred embodiment of the present invention. The molecules of the liquid crystal 6 assume a structure twisted by an angle $W_1$ between the direction $D_1$ for the preferential alignment treatment of the molecules of the liquid crystal 6 in the substrate 1 and the direction $D_2$ for the preferential alignment treatment in the substrate 11. In this way, the angle $W_1$ is a twist angle determined by the alignment treatment. The alignment can be controlled by the well known oblique vapor deposition method or by rubbing with a cotton cloth after the formation of organic or inorganic deposition layers. In the preferred embodiment according to the present invention, those liquid crystal 6 prepared by adding cholesteric liquid crystals or chiral nematic liquid crystals to nematic liquid crystal having a positive dielectric anisotropy and adjusting to an appropriate pitch are preferably used. In this case, if the angle $W_1$ is too small, the abruptness is worsened to reduce the time divisional driving characteristics. Furthermore, if the angle $W_1$ is excessively large, scattered tissues occur upon applying an electric field to undesirably reduce the display quality. Thus, it is preferred that the angle $W_1$ be from 120° to 360°. However, it is sufficient that the angle $W_1$ be such that an adequate display characteristic be provided without substantially reducing the time divisional driving.

From FIG. 3, it may be seen that when the cell of the liquid crystal 6 is viewed from the side of the first substrate 1, the twisting direction is light-turned from the second substrate 11 (lower substrate) to the first substrate 1 (upper substrate), but it may be light-turned depending on the direction of the alignment treatment, or by the selection of the cholesteric liquid crystal or the chiral liquid crystal.

When disposing the birefringent medium 7 between the substrate 1 and the polarization means 2 as in the constitutional embodiment of the liquid crystal display device 15 according to the present invention, light permeable glass or plastic, for example, may be used as the substrates 1 and 11. When using a plastic substrate, it is easy to reduce the thickness of the substrate 1 and 11 to less than 0.2 mm and, accordingly, a display device 15 can be formed with an extremely reduced thickness and weight. Furthermore, since the thickness of the substrate 1 and 11 is reduced, a display device 15 with no double images on the display, and having a wide view angle can be obtained.

In addition, as another embodiment of the present invention, the substrate itself can serve also as the birefringent medium. In this case, although the layer constitution of the display device is the same as the liquid crystal display device of a conventional STN type, it is different in that at least one of the upper and lower substrates has the birefringent property. The substrate serving also as the birefringent medium may be constituted with birefringent material alone, or it may be laminated with other material such as film, glass, etc.

As a further embodiment according to the present invention, birefringent medium can be incorporated as the constituent factor for the polarization means itself. In polarization plates utilizing dichroism of iodine or dye generally employed, a polarization function is provided by absorbing iodine or dye on a stretched film and, further, sandwiching the stretched film with other two sheets of films for the protection, but the birefringent medium may be disposed between the protection film on the side of the liquid crystal layer from the stretched film essentially having the polarization function and the stretched film, or the protection film on the side of the liquid crystal may be constituted with the birefringent medium.

As has been described above, the birefringent medium according to the present invention may be disposed any position so long as it is disposed between the liquid crystal layer and the polarization means.

It is necessary that the birefringent medium referred to herein has the anisotropy of the refractive index in the plane and also has light permeability. Specifically, there can be exemplified stretched or extruded molding film made of any of polymer materials, for example, aromatic polymers such as polyester, polycarbonate, polyallylate, polyether, ether ketone, polysulfone and polyether sulfone, polyolefinic polymers such as polyethylene and polypropylene, vinylic polymers such as vinylidene chloride, polyvinyl alcohol, polystyrene and acrylic resin, cellulose and derivative thereof, for example, regenerated cellulose (cellophane), diacetyl cellulose, triacetyl cellulose, etc. Furthermore, there can also be exemplified slices of crystals such as of mica, calcite and quartz cut out along the plane parallel with the optical axis. Polymeric material can be utilized particularly advantageously since material of large area can be available with ease.

The anisotropy of refractive index of the birefringent medium $\Delta n(BM)$ is defined as the difference between the refractive index of such medium to the polarized light in parallel with the maximum refractive index direction in the plane in parallel with the substrate (main refractive index direction) and the refractive index thereof to the polarized light in perpendicular thereto. It is necessary that the optical axis of the birefringent medium is inclined to the polarization axis of the adjacent polarization means, that is, it is maintained at an angle other than the parallelism and orthogonal crossing. If the main refractive index direction of the birefringent medium is in parallel with or in perpendicular to the polarization axis of the polarization means, the effect of the present invention can not be attained at all but it merely provides the display on a colored background. A preferred range for the angle of inclination between the optical axis of the birefringent medium and the polarization transmission axis of the polarization means (absolute value for the angle $\beta_1$ in FIG. 3) is from 20° to 70°, particularly, from 30° to 60° and, more preferably, about 45°.

As shown in FIG. 3, the transmission axis $P_2$ of the polarization means 12 in adjacent with the second substrate 11 makes an angle of $\beta_2$ with the alignment direction $D_2$ of liquid crystal 6 on the second substrate 11. The main refractive index direction B of the birefringent medium 7 (the direction along which the refractive index is the greatest within the film plane) has an angle of $\delta$ relative to the direction $D_1$ for the alignment of liquid crystal 6 on the adjacent substrate 1. Furthermore, the transmission axis $P_1$ of the polarization means 2 in adjacent with the birefringent medium 7 and the main refractive index direction B of the birefringent medium 7 are disposed as making an angle of $\beta_1$. The angles are expressed while assuming the direction of twisting for the liquid crystal 6 is as positive.

Although the explanation has been made in FIG. 3 referring to the transmission axis of the polarization means 2 and 12, it would be quite equivalent if all of the matters in the explanation were replaced with those of the absorption axis of the polarization means 2 and 12.

When passing through the liquid crystal layer in the STN type liquid crystal display device according to the present invention, the light is formed into elliptically polarized light having elliptical ratio and elliptic azimuth depending on the wavelength thereof. The principle of the present invention is to reform such polarized light into linearly polarized light or elliptically polarized light approximate to linearly polarized light by the birefringent medium again and pass the polarized light through the polarization means disposed in parallel with or in perpendicular to the linearly polarized direction thereby obtaining black or white background color upon not applying voltage. Although the color is actually not white but colorless transparent, it is referred to as white for the sake of the conveniency. For attaining the above-mentioned principle and obtaining a display device capable of black and white display, excellent in display quality with less color unevenness, there is present a particularly preferred range for the angular relationship and the retardation of the liquid crystal layer and the birefringent medium layer.

The first preferred range is defined in relation with absolute value for the angle $\beta_2$ in a range of 20° to 70°.

Table 1 shows a relationship between the contrast and the angle $\delta$ upon operation for an instance where the angle $W_1$ is 200°, the angle $\beta_2$ is 45°, the angle $\beta_1$ is 45°, the product $\Delta n(LC)d(LC)$ of the refractive index anisotropy of the liquid crystal $\Delta n(LC)$ and the thickness of the liquid crystal layer d(LC) is 0.90 μm, and the product $\Delta n(BM)d(BM)$ of the refractive index anisotropy of the birefringent medium $\Delta n(BM)$ and the film thickness d(BM) is 0.83 μm. An iodine type neutral grey polarization plate is used as the polarization plate (herein and hereinafter).

TABLE 1

| δ(deg) | contrast |
|---|---|
| 40 | 1.9 |
| 55 | 3.7 |
| 70 | 8.1 |

TABLE 1-continued

| δ(deg) | contrast |
|---|---|
| 85 | 15.4 |
| 100 | 12.9 |
| 115 | 6.9 |
| 130 | 4.4 |
| 145 | 3.8 |

As the angle δ increases from 45° to 145°, the color of the cell of the liquid crystal changes as: extremely pale blue→extremely pale green→extremely pale yellow, thereby enabling to obtain a substantially white background. In view of the above, it is necessary for obtaining the high contrast that the angle δ is within a range of 60° to 120° and, more preferably, 70° to 110°. The above-mentioned trend is also applicable to a case where the angle $W_1$, or $\Delta n d$ of the liquid crystal layer, $\Delta n d$ of the birefringent medium, etc. are changed.

Generally, light transmitting through the medium having optical anisotropy causes a phase difference between the phase of the normal rays and that of abnormal rays. In the present invention, it is important for obtaining black and white display and high contrast to take a matching for the retardation between the liquid crystal layer and the birefringent medium layer. In this case, the retardation of the birefringent medium $R_{BM}$ (unit: radian) is defined by the following equation:

$$R_{BM} = \frac{\Delta n(BM) \cdot d(BM)}{\lambda} \pi \quad (I)$$

where $\Delta n(BM)$ represents refractive index anisotropy of the birefringent medium, d(BM) represents the thickness of the birefringent medium and λ represents wavelength of light.

The retardation $R_{LC}$ for the liquid crystal layer is defined by the following equation.

$$R_{LC} = \sqrt{W_1^2 + \left(\frac{\Delta n(LC) \cdot d(LC)}{\lambda} \pi\right)^2} \quad (II)$$

where $\Delta n(LC)$ represents the refractive index anisotropy of liquid crystal, d(LC) represents the thickness of the liquid crystal layer, λ represents the wavelength of light and $W_1$ represents the twist angle of the liquid crystal molecules between the substrates (unit: radian).

The wavelength λ of the light described above is usually represented by 550 nm.

In the present invention, it is preferred that $R_{LC}$ and $R_{BM}$ are substantially equal with each other, or $R_{LC}$ is greater than $R_{BM}$ by a range of less than 0.75 π radian or greater by a range from 0.82 π radian to 1.1 π radian. Preferred conditions are written as below:

$$\left. \begin{array}{c} R_{LC} - R_{BM} \approx 0 \\ \text{or} \\ 0 < R_{LC} - R_{BM} \leq 0.75\pi \\ \text{or} \\ 0.82\pi \leq R_{LC} - R_{BM} \leq 1.1\pi \end{array} \right\} \quad (III)$$

Table 2 shows the color change of the cell under the same condition as in Table 1 (providing that δ=90°) when the $\Delta n d$ of the liquid crystal layer is changed ($R_{BM} = 1.51\pi$).

TABLE 2

| Δn(LC)d(LC) (μm) | $R_{LC}$ (rad) | $R_{LC}-R_{BM}$ (rad) | cell color |
|---|---|---|---|
| 1.22 | 2.48π | 0.97π | deep purple |
| 1.10 | 2.29π | 0.78π | yellow red |
| 1.02 | 2.16π | 0.65π | pale yellow |
| 0.94 | 2.04π | 0.53π | reddish white |
| 0.86 | 1.92π | 0.41π | white |
| 0.78 | 1.80π | 0.29π | blue greenish white |
| 0.70 | 1.69π | 0.18π | grey |
| 0.62 | 1.58π | 0.07π | yellowish black |
| 0.58 | 1.53π | 0.02π | yellowish black |
| 0.50 | 1.44π | −0.07π | purple |
| 0.40 | 1.33π | −0.18π | deep purple |

As can be seen from Table 2, if $R_{LC}$ is greater than $R_{BM}$ by about 0.8π, coloration is remarkable upon absence of applied voltage, which is undesirable. On the contrary, if $R_{LC}$ is smaller than $R_{BM}$ by more than 0.15π, coloration also become remarkable. After all, it is suitable to set $R_{LC}-R_{BM}$ within a range from −0.15π to +0.75π.

Taking a range capable of obtaining further higher contrast into consideration, it is preferred to set $R_{LC}-R_{BM}$ to a range from −0.15π to +0.15π or from +0.22π tp +0.75π. In the former case, the cell is black upon absence of applied voltage, whereas it is white in the latter upon absence of applied voltage. In these cases, a display device of higher contrast can be obtained by setting Δn(BM)d(BM) to between 0.5 μm and 2 μm.

Further, as another preferred range, it can be exemplified that $R_{LC}$ is made greater than $R_{BM}$ by from 0.82π to 1.1π, if Δn(BM)d(BM) is between 0.2 μm and 0.5 μm. As in the case where Δn(BM)d(BM) is between 0.5 μm and 2 μm, if the value is out of the above-mentioned range, coloration is resulted or the contrast is reduced also in this case. Further, if both of the angle $\beta_1$ and the angle $\beta_2$ are positive, the cell is black upon absence of applied voltage in this case.

Although explanations have been made for the case where both of the angle $\beta_1$ and the angle $\beta_2$ are positive, the situations are quite the same when both of them are negative. Further, if the signs for $\beta_1$ and $\beta_2$ are opposite, black and white are reversed.

Figure 4:
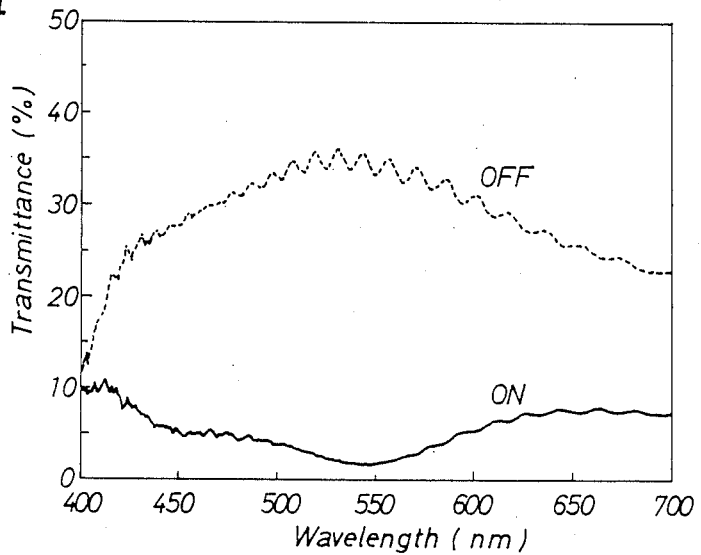
FIG. 4 is a graph showing the relationship between the wavelength (nm) and the light transmittance quality (%) in the liquid crystal display device according to the present invention.
Figure 5:
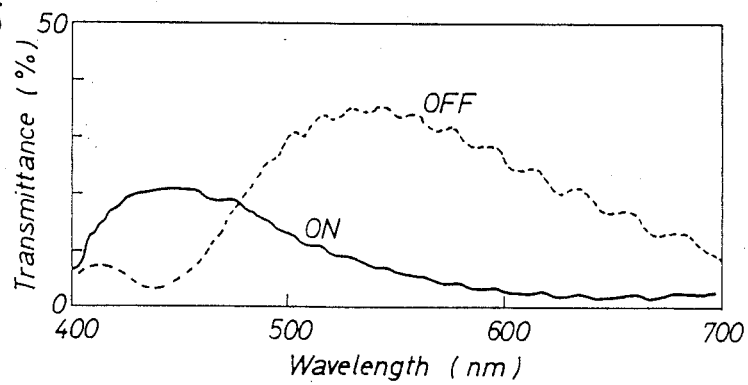
FIG. 5 is a graph showing the relationship between the wavelength (nm) and the light transmittance quality (%) in the conventional liquid crystal display device.

In the embodiment according to the present invention, white or black color is obtained upon absence of applied voltage and it becomes black or white upon application of voltage as exemplified in FIG. 4. FIG. 5 exemplifies the transmission spectrum of a conventional STN type liquid crystal display device for comparison.

The angular relationship and the preferred second range for the retardation of the liquid crystal layer and the birefringent medium layer are defined in relation with the absolute value for the angle $\beta_2$ within a range of 0° to 25°. In this range for the angle $\beta_2$, it is necessary that the angle δ is within a range of 20° to 130°. Table 3 shows the color of the cell upon absence of applied voltage and the contrast during operation in a case where Δn(BM)d(BM)=0.413 μm, Δn(LC)d(LC)=0.54 μm, $W_1=200°$, $\beta_2=0°$, $\beta_1=45°$.

TABLE 3

| δ(deg) | cell color | contrast |
|---|---|---|
| −20 | dark purple | 4.4 |
| 10 | dark purple | 5.1 |
| 40 | purple black | 10.7 |
| 70 | black | 35.0 |
| 100 | red purple black | 25.0 |
| 130 | dark purple | 7.2 |

TABLE 3-continued

| δ(deg) | cell color | contrast |
|---|---|---|
| 150 | dark purple | 4.6 |

As can be seen from Table 3, contrast becomes high within a range of the angle δ from 20° to 130° and the color approaches black. A preferred range for the angle δ is from 40° to 110°. In this case, cell becomes white by upon application of voltage thereby enabling to obtain a preferred black and white contrast. For obtaining satisfactory black and white display, it is further necessary to set the retardation of the birefringent medium ($R_{BM}$) from 0.125π to 1 π (rad). This is within a range from 0.07 μm to 0.55 μm as converted into Δn(BM)d(BM). If the value is out of this range, Δnd of the liquid crystal turning white or black upon absence of applied voltage is no more present to bring about colored background or reduce the contrast extremely. More preferred range for $R_{BM}$ is from 0.55π to 0.94π and Δn(BM)d(BM) from 0.30 to 0.52 μm as converted into Δnd.

The liquid crystal display device satisfying the conditions described above is black upon absence of applied voltage and turns white (colorless transparent) when applying voltage.

Further, with the same reason, it is preferred to set the retardation of the liquid crystal layer ($R_{LC}$) to about 1.5 π or 2 π radian. Table 4 shows the color of the cell in the case where Δn(BM)d(BM)=0.43 μm, $W_1=200°$, $\beta_2=0°$, $\beta_1=45°$ and δ=90°. A preferred range for $R_{LC}$ is, for example, within a range from 1.35π–1.7π or 1.8π–2π.

TABLE 4

| Δn(LC)d(LC) (μm) | $R_{LC}$ (rad) | cell color |
|---|---|---|
| 0.4 | 1.33π | purple |
| 0.5 | 1.44π | dark purple |
| 0.55 | 1.49π | purple black |
| 0.6 | 1.56π | black |
| 0.65 | 1.62π | red purple black |
| 0.7 | 1.69π | dark red purple |
| 0.75 | 1.76π | red purple |
| 0.8 | 1.83π | reddish white |
| 0.85 | 1.90π | slightly reddish white |
| 0.9 | 1.98π | yellow |
| 1.0 | 2.13π | red yellow |

Although explanations have been made for the case where the twist angle $W_1$ is 200°, the situations are the same for other twist angles. Further, the situation is also the same in a case where the birefringent minimum is integrated with the substrate or the polarization plate.

As has been described above, background color of the device can be made white or black, which can be turned black to dark blue or white when applying voltage and thus black and white display is possible by selecting the retardation of the liquid crystal and the birefringent medium from the range as described above. Further, since the constitution of the device is quite the same as the conventional liquid crystal display device except for providing the substrate with the birefringency or disposing the birefringent medium between the liquid crystal layer and the polarization means, it can be manufactured with extreme ease. Furthermore, since the spectral transmittance in the visible ray region, is substantially flat, there is no light leakage depending on wavelength and it can be applied to an optical shutter in the case of color display.

Although the explanations have been made as one sheet of birefringent medium is used, several sheets of media can also be used. In this case, the birefringent media may be disposed only one side or on both sides of the liquid crystal layer. Furthermore, in a case of constituting the display device by using two sheets of birefringent media, both of the optical axes may be inclined to the polarization axes of the adjacent polarization means as described above, or only one of them may be inclined. In the latter case, there is no restriction for the retardation of the birefringent medium disposed in parallel with or in perpendicular to the polarization axis and birefringent medium with the retardation of greater than 10 μm, etc. can be used.

In this embodiment, although the birefringent medium is disposed between the polarization means and the substrate, the birefringent medium may be disposed between the substrate and the electrode/alignment film, or may be disposed between the alignment film and the liquid crystal.

Specific values for d(BM) and Δn(BM).d(BM) of the birefringent medium according to the present invention are exemplified below.

TABLE 5

| Kind of film | d(BM) (μm) | Δn(BM).d(BM) (μm) |
|---|---|---|
| Polypropylene (stretched) | 20 | 0.30 |
| " | 30 | 0.44 |
| " | 40 | 0.638 |
| " | 50 | 0.834 |
| " | 55 | 0.900 |
| Cellophane | 35 | 0.30 |
| " | 50 | 0.41 |
| Triacetyl cellulose | 400 | 0.56 |
| " | 100 | 0.13 |

Since these polymeric films have flexibility, they may be appended with each other by forming as adhesive layer on the surface, as well as it can be easily appended on the surface of the plastic substrate liquid crystal cell in which cell itself has flexibility. In addition, since the polymeric material described above is extremely inexpensive, increase of the cost can be reduced.

According to the preferred embodiments of the present invention, it is possible to obtain a black and white display liquid crystal display device capable of simply overcoming the problems of the coloration which is the drawbacks of the STN type liquid crystal display device and excellent in the display quality.

The black and white display liquid crystal display device according to the preferred embodiments of the present invention uses a birefringent medium as a color offsetting compensation plate different from conventional cases using the liquid crystal device and, accordingly, increase in the thickness and the weight can be reduced and the device can be manufactured at a reduced cost.

EXAMPLE

The present invention is to be described more specifically referring to examples.

Example 1

A liquid crystal display device having transparent electrodes in which the twist angle of liquid crystal between both of upper and lower glass substrates is 200° and Δn(LC).d(LC) is 0.92 μm ($R_{LC}=2.0\pi$ rad) is manufactured. In this case, a liquid crystal prepared by adding chiral nematic substrate S811 to a nematic liquid crystal ZLI2293 having positive dielectric anisotropy is used. The alignment treatment in this liquid crystal is applied by the rubbing treatment of a polyimide film. A neutral grey polarization plate equipped with a reflection plate is disposed below the cell such that the axis of transmission thereof makes an angle of 45° with respect to the rubbing direction of the lower substrate ($\beta_2=45°$). On the upper substrate, there is disposed a stretched polypropylene film of 50 μm thickness ($R_{BM}=1.52\pi$ rad. Δn(BM).d(BM)=0.834 μm) such that the main refractive index direction thereof is perpendicular to the rubbing direction of the upper substrate ($\delta=90°$). A polarization plate is disposed over the film such that the axis of transmission thereof makes an angle of $-45°$ ($\beta_1=-45°$) with the main refractive index direction of the film ($R_{LC}R_{BM}=0.48\pi$ rad).

The liquid crystal display device being thus constituted turns black upon absence of applied voltage, while turns white upon application of voltage and enables black and white display.

In addition, the abruptness γ of voltage - transmittance characteristics is not more than 1.03 and it shows excellent time divisional driving characteristics. The black and white colors are reversed in the display device by rotating the upper or lower polarization plate by 90°. When the film is rotated horizontally on the substrate while keeping the angle $\beta_1$ constant at 45°, a satisfactory contrast is shown at the angle δ within a range from 60° to 120°, whereas the contrast is reduced other than above.

Example 2

A display device is manufactured in the same manner as in Example 1 except for changing only Δn(LC).d(LC) of the liquid crystal layer to 0.6 μm ($R_{LC}=1.56\pi$ rad) ($R_{LC}-R_{BM}=0.04\pi$ rad). The liquid crystal display device constituted in this way is white upon absence of applied voltage and turns black upon applying voltage.

Example 3

A display device is manufactured in the same manner as in Example 1 except for changing Δn(LC).d(LC) of the liquid crystal layer to 0.6 μm ($R_{LC}=1.56\pi$ rad) and using a cellophane of 40 μm thickness with Δn(BM)d(BM)=0.34 μm ($R_{BM}=0.62\pi$ rad) as the birefringent medium ($R_{LC}-R_{BM}=0.94\pi$ rad), and the upper polarization plate is disposed at the position: $\beta_1=45°$. The display device is black upon absence of applied voltage and turns white upon application of voltage.

Example 4

A display device with the angle $W_1$ of 180° and Δn(LC).d(LC) of 0.72 μm is manufactured in the same manner as in Example 1 ($R_{LC}=1.72\pi$ rad). A lower polarization plate is disposed to the cell such that the polarization plate makes the angle $\beta_2=45°$. A stretched polyester film with Δn(BM).d(BM)=0.63 μm ($R_{BM}=1.15\pi$ rad) is disposed above the cell such that the main refractive index direction thereof is perpendicular to the rubbing direction of the upper substrate. The upper polarization plate is disposed such that the polarization axis is $-45°$ or 45°. The display device is black and white at the respective disposition of the polarization plate upon absence of applied voltage. It turns white and black respectively upon application of voltage.

Example 5

A display device with the angle $W_1$ of 240° and $\Delta n(LC).d(LC)$ of 1.0 μm is manufactured in the same manner as in Example 1 ($R_{LC}=2.25\pi$ rad). A polypropylene film with $\Delta n(BM)d(BM)=0.94$ μm ($R_{BM}=1.71\pi$ rad) is used as the birefringent medium in the cell to constitute the display device in the same manner ($\beta_2=45°$, $\delta=90°$, $\beta_1=45°$).

Also in the display device, black and white display is possible and an extremely excellent time divisional driving characteristics with the abruptness of 1.02 is shown.

Example 6

A liquid crystal composition prepared by adding 0.5% of chiral nematic liquid crystals (S811 manufactured by Merck Co.) to nematic liquid crystals with refractive index anisotropy of 0.115 is used. Polyimide is coated to the glass substrate and applied with rubbing, and the upper and the lower substrates are appended so as to form the twist angle of 180°, between which the liquid crystal composition described above is filled. The thickness of the liquid crystal layer is 5.2 μm ($\Delta n(LC).d(LC)=0.6$ μm. $R_{LC}=1.48\pi$ rad).

A lower polarization plate is disposed such that the angle $\beta_2$ equals to 0°. A cellophane film with $\Delta n(BM).d(BM)=0.41$ μm ($R_{BM}=0.78$ μm) is laminated above the cell such that the main refractive index direction makes an angle of 70° with the rubbing direction of the upper substrate. The polarization plate is disposed over the film such that the angle $\beta_1$ equals to 45°.

The display device is substantially black completely upon absence of applied voltage and turns white upon application of voltage.

When the film is rotated on the substrate horizontally while maintaining the angle $\beta_1$ at 45°, the cell is substantially black within a range of the angle $\delta$ from 20° to 130° to obtain satisfactory contrast upon application of voltage, whereas the cell colors purple other than the above.

Example 7

A display device with $\Delta n(LC).d(LC)=0.53$ μm ($R_{LC}=1.4\pi$ rad) is manufactured in the same manner as in Example 6. A lower polarization plate is disposed such that the angle $\beta_2$ equals to 0°. A triacetyl cellulose film with $\Delta n(BM).d(BM)=0.14$ μm ($R_{BM}=0.25\pi$ rad) is laminated above the plate such that the main refractive index direction makes an angle of 90° with the rubbing direction of the upper substrate and then an upper polarization plate is disposed such that the angle $\beta_1$ equals to $-45°$.

The display device shows substantially black upon absence of applied voltage and white upon application of voltage.

Example 8

A display device is manufactured in the same manner as in Example 1 except for using a plastic film made of polyether sulfone as the substrate. The display device shows black and white display in the same manner as in the case of using the glass substrate, shows excellent time divisional driving characteristics and shows excellent display quality with wide view angle without double images in the display.

Example 9

A triacetyl cellulose film having transparent electrodes with $\Delta$nd of 0.56 μm is applied with horizontal alignment treatment by rubbing along the 90° direction relative to the optical axis thereof (hereinafter, referred to as a lower substrate B). Further, horizontal alignment treatment is applied to a same kind of film by rubbing along 45° direction with the optical axis thereof (hereinafter referred to as an upper substrate A). Then, both of the substrates A and B are appended with each other so as to form the twist angle of 200°. The distance between both of the substrates A and B is set to 7 μm by a spacer. Nematic liquid crystals having positive dielectric anisotropy with $\Delta n=0.10$ μm with addition of chiral nematic liquid crystals S811 are filled between both of the substrates A and B. A pair of polarization plates are disposed on the outer sides of the substrates A and B. The polarization plate on the side of the substrate B is disposed such that the axis of transmission thereof makes an angle of 45° with the rubbing direction assuming the direction of twisting from the substrate B to the substrate A is positive. The optical axis of the substrate A is made in parallel with the axis of the transmission of the polarization plate.

With the constitution described above, a liquid crystal display device according to the present invention is obtained with $\Delta n(LC).d(LC)=0.7$ μm, $\Delta n(BM).d(BM)=0.6$ μm, $\beta_1=45°$, $\beta_2=45°$, $\delta=90°$.

The display device is white (colorless) upon absence of applied voltage and can provide black display upon application of voltage. Abruptness is 1.04 which is extremely excellent. Black-white reversed display is obtained by rotating the polarization plate on the side of the first substrate by 90° ($\beta_2=-45°$).

Example 10

A display device with the twist angle of 200° is manufactured in the same manner as in Example 9 using glass laminated with a stretched film of regenerated cellulose as the substrate B and a glass plate as the substrate A ($\Delta n(LC).d(LC)=0.7$ μm, $\Delta n(BM).d(BM)=0.6$ μm, $\beta_1=45°$, $\beta_2=45°$, $\delta=90°$). The display device also can provide black and white display and shows excellent time divisional driving characteristics.

Example 11

A display device is manufactured in the same manner as in Example 10 ($\Delta n(LC).d(LC)=0.6$ μm, $\Delta n(BM).d(BM)=0.41$ μm, $\beta_1=0°$, $\beta_2=45°$, $\delta=60°$). The display device also can provide black and white display and shows excellent time divisional driving characteristics.

What is claimed is:

1. A liquid crystal display device, comprising:
    (a) a liquid crystal layer disposed between a pair of light permeable substrates, an alignment of a liquid crystal of said liquid crystal layer being substantially horizontal relative to said substrates in the absence of applied voltage, said liquid crystal layer having a twisted structure with a twist angle along a direction of a thickness thereof such that an adequate display is provided without substantially reducing the time divisional driving;
    (b) a pair of polarization means disposed on both outsides of said liquid crystal layer; and
    (c) at least one birefringent medium layer disposed between one side of said liquid crystal layer and the polarization means on said one side of said liquid crystal layer;

an optical axis of said birefringent medium layer being inclined toward a polarization axis of the adjacent polarization means, the alignment direction of said liquid crystal on a surface of another side of said liquid crystal layer making an angle from 0° to 25° relative to the polarization transmission axis or an absorption axis of the polarization means, the direction of a maximum refractive index of said birefringent medium layer and the alignment direction of said liquid crystal on a surface of said one side of said liquid crystal layer making an angle 20° to 130° while a retardation of said birefringent medium layer is in a range of $0.125\pi$ rad to $1\pi$ rad and a retardation of said liquid crystal layer is about $3/2\pi$ rad or about $2\pi$ rad.

* * * * *